United States Patent [19]
Zurek et al.

[11] Patent Number: 5,355,726
[45] Date of Patent: Oct. 18, 1994

[54] HOUSING FOR REDUCING BACK AIR FLOW TO MASS AIR FLOW SENSORS

[75] Inventors: Lawrence A. Zurek, Harrison Township, Macomb County; Lorna J. Clowater, Canton, both of Mich.

[73] Assignee: Ford Motor Company, Dearborn, Mich.

[21] Appl. No.: 176,987

[22] Filed: Jan. 3, 1994

[51] Int. Cl.5 .................. G01F 1/68; G01M 15/00
[52] U.S. Cl. .................. 73/202.5; 73/118.2
[58] Field of Search .............. 73/118.2, 202, 202.5

[56] References Cited

U.S. PATENT DOCUMENTS

| | | | |
|---|---|---|---|
| 4,393,697 | 7/1983 | Sato et al. | 73/118 |
| 4,478,075 | 10/1984 | Oyama et al. | 73/118.2 |
| 4,911,009 | 3/1990 | Maeda et al. | 73/204.25 |
| 4,974,445 | 12/1990 | Arai et al. | 73/118.2 |
| 4,982,602 | 1/1991 | Stiefel et al. | 73/202.5 |
| 5,179,858 | 1/1993 | Atwood | 73/118.2 |
| 5,231,871 | 8/1993 | Arai et al. | 73/118.2 |

Primary Examiner—Herbert Goldstein
Attorney, Agent, or Firm—Roger L. May; Peter Abolins

[57] ABSTRACT

A housing structure for reducing back air flow to the mass air flow sensor of an internal combustion engine. The housing structure consists of a housing defining a main air flow passage therethrough. A bypass passage is provided in the housing parallel to a longitudinal axis of the main air flow passage which receives therein the sensing head of the mass air flow sensor. A recovery chamber is connected to the bypass passage and is enclosed by an internal structure. The internal structure forms a pair of venturies with the sidewalls of the housing which induces an air flow through the bypass passage and the recovery chamber. A calibrated aperture is provided through the internal structure connecting the recovery chamber to the main air flow passage downstream of the bypass passage. The calibrated aperture reduces the air flow through the bypass passage during a back air flow.

17 Claims, 3 Drawing Sheets

HOUSING FOR REDUCING BACK AIR FLOW TO MASS AIR FLOW SENSORS

TECHNICAL FIELD

The invention is related to the field of mass air flow sensors and, in particular, to a housing structure for reducing the back air flow to the mass air flow sensor under predetermined engine operating conditions.

BACKGROUND ART

In most internal combustion engines, the air intake valve remains open during an initial portion of the compression stroke or will open prior to the completion of the exhaust stroke of the engine. These conditions, when they occur, may produce a momentary back air flow through the engine's air intake manifold. This momentary lack of air flow is most pronounced for four cylinder engines within a defined engine speed range.

Thermal mass air flow sensors of the type taught in U.S. Pat. No. 4,974,445, U.S. Pat. No. 5,231,871 and U.S. Pat. No. 4,911,009 have a high response rate and do not require compensation for the pressure of the air flow being detected. However, these thermal mass air flow sensors are not capable of discriminating the direction of mass air flow in the engines air intake manifold and thus will produce an output in response to the back air flow as well as the forward air flow. As a result, the mass air flow sensor will detect the back air flow and produce a faulty mass air flow signal which causes an associated electronic fuel control computer to deliver an excessive amount of fuel to the engine when operating within the defined engine speed range.

In FIG. 1, curve 4 shows an approximation of an actual mass air flow required by a four cycle, four cylinder internal combustion engine as a function of engine speed given in revolutions per minute (RPM).

The mass air flow rate in FIG. 1 is given as a typical output voltage of the mass air flow sensor. Curve 6 depicts the mass air flow as measured by a mass air flow sensor mounted in the intake manifold of the engine. As is apparent from FIG. 1, the output (voltage) signal generated by the mass air flow sensor in the engine speed range between 1000 and 2500 RPM is significantly distorted by the back air flow produced by the engine between the opening of the engine's intake valve and the completion of the exhaust stroke of the associated piston. Unfortunately, the speed range at which the output signal generated by the mass air flow sensor is distorted is within the speed range of the engine for nominal vehicle operations as may be encountered in city driving.

This problem has been addressed by Oyama et al. in U.S. Pat. No. 4,478,075. Oyama teaches the application of the back air flow to reduce the value of the forward air flow so that the resultant measure air flow is substantially equal to the air flow required by the engine.

SUMMARY OF THE INVENTION

The invention is a housing structure for reducing the sensitivity of a mass air flow sensor mounted thereon to back air flow produced by an internal combustion engine. The housing structure consists of a housing enclosing a main air flow passage through which air is supplied to the internal combustion engine. The housing has an input end, an output end and a longitudinal axis. An auxiliary air passage is disposed in the housing which consists of a bypass passage substantially parallel to the longitudinal axis of the main air flow passage and a recovery chamber connected to the bypass passage. The bypass passage has an inlet port at one end and the opposite end is connected to the recovery chamber. The recovery chamber has at least one outlet provided at the end opposite the bypass passage. The recovery chamber is enclosed by an internal structure which produces a pair of venturies in combination with the walls of the housing. The venturies produce low pressure regions in the vicinity of the outlets in response to an air flow through the main air flow passage. The low pressure in the vicinity of the outlet induces an air flow through the auxiliary air passage. An aperture having a predetermined cross-sectional area relative to the cross-sectional area of the outlet is provided through the internal structure connecting the recovery chamber to the main air flow passage downstream of the internal structure. The mass air flow sensor has a sensing head which extends into the bypass passage and generates a signal having a value corresponding to the mass air flow through the bypass passage.

The advantage of the housing structure is that the aperture connecting the recovery chamber to the main air flow passage directs a portion of the back air flow to the outlet of the recovery chamber, reducing the air flow through the bypass passage, thereby reducing the value of the signal generated by the mass air flow sensor in response to a back air flow.

This and other advantages of the housing structure for reducing the effect of the back air flow on the value of the signal generated by the mass air flow sensor will become more apparent from a reading of the specification with reference to the drawings.

DETAILED DESCRIPTION OF THE PREFERRED EMBODIMENT

Figure 2:
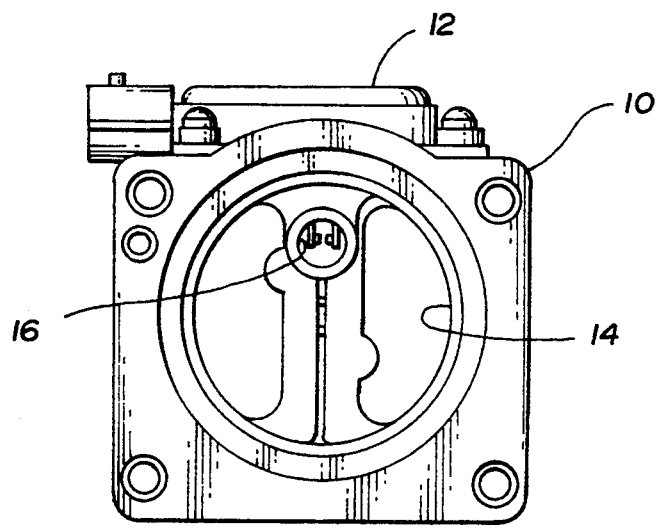
FIG. 2 is a front view of the housing.
Figure 3:
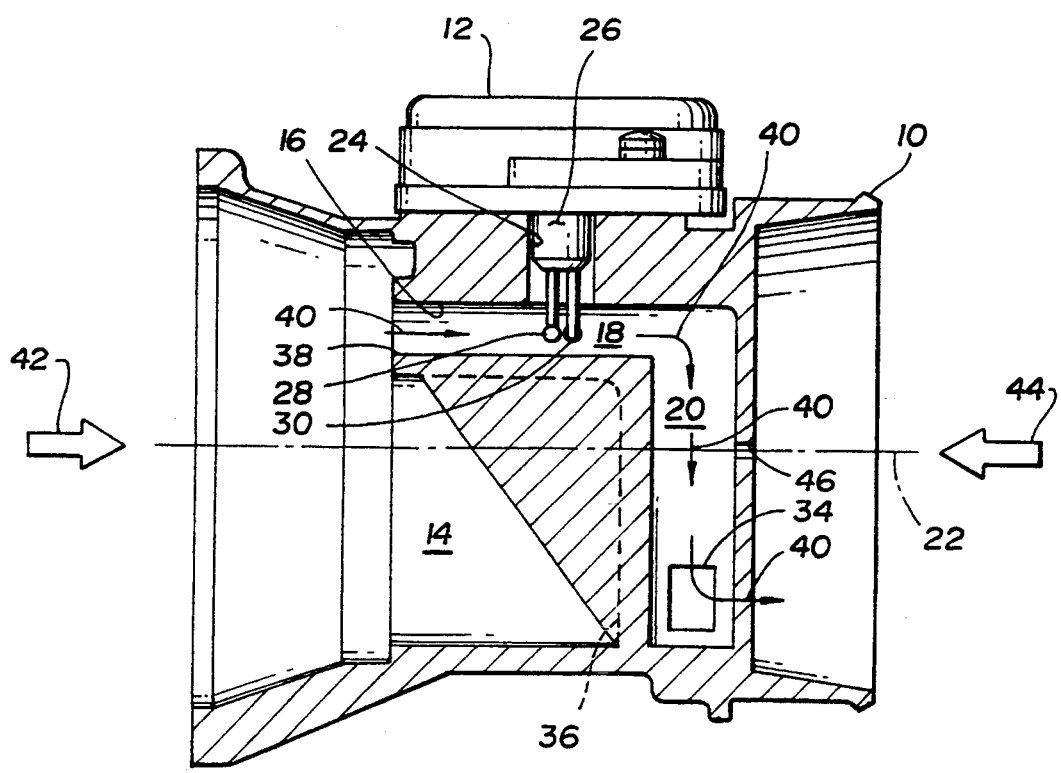
FIG. 3 is a cross-sectional side view of the housing.
Figure 4:
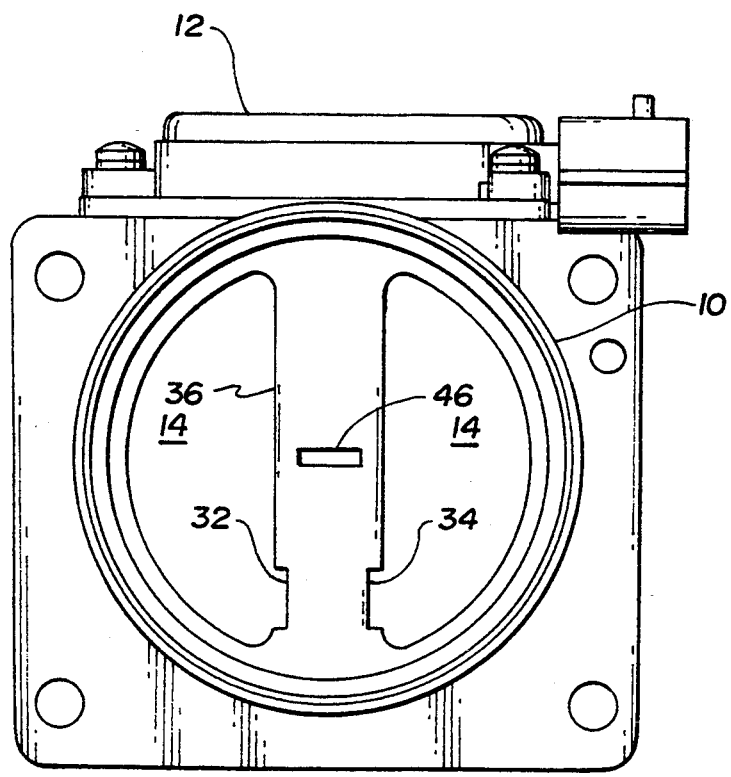
FIG. 4 is a rear view of the housing.

A preferred embodiment of a housing structure for a sensor mount capable of reducing the errors in the output of a mass air flow sensor 12 due to a back air flow is shown in FIGS. 2, 3 and 4. The housing structure has a housing 10, the structure of which is similar to that taught by Arai et al. in U.S. Pat. No. 4,974,445. The housing 10 encloses a generally circular main air flow passage 14 and an auxiliary passage 16. The housing 10 is normally part of the air intake manifold system of the internal combustion engine and is disposed between an air cleaner (not shown) and the engine's air intake manifold (not shown) in a conventional manner.

The bulk of the air being inhaled by the engine flows through the main air flow passage 14 while a reduced volume of air flow flows to the sensing elements of the mass air flow sensor through the auxiliary air passage 16. The auxiliary air passage 16 has a bypass passage 18 which is substantially parallel to the main air flow passage 14 and a recovery chamber 20 disposed downstream of the bypass passage 18. Preferably, the recovery chamber 20 is radially disposed relative to the main air flow passage 14 as shown in FIG. 3. In the preferred embodiment shown, in FIGS. 2, 3 and 4, the bypass passage 18 of the auxiliary air passage is radially offset from the longitudinal axis 22 of the main air flow passage 14 and is adjacent to an external wall of the housing 10. An aperture 24 permits the sensing head 26 of the mass air flow sensor 12 to extend into the bypass passage 18 with the sensing elements 28 and 30 of the mass air flow sensor 12 centrally located therein. The mass air flow sensor 12 is attached to the housing 10 in a conventional manner using screw-type fasteners such as screws 21 shown in FIG. 2.

The recovery chamber 20 of the auxiliary air passage 16 has one end connected to the downstream end of the bypass passage 18 and extends diametrically across the housing 10. The other end of the recovery chamber 20 terminates in a pair of rectangularly-shaped outlets 32 and 34 on opposite sides thereof as shown in FIGS. 3 and 4. The cross-sectional areas of the outlets 32 and 34 are selected to produce desired mass air flow rates through the bypass passage 18 which are a known function of the mass air flow rate through the main air flow passage 14. An internal structure 36 encloses the recovery chamber 20 and forms, in combination with the walls of the housing 10, a pair of venturies. These venturies produce low pressure areas in the region of the outlets 32 and 34. The low pressure regions formed at the outlets 32 and 34 induces an air flow through the auxiliary air passage 16 from its inlet port 38 out through the outlets 32 and 34 as indicated by arrows 40. In FIG. 3, the large arrow 42 is the normal direction of mass air flow through the housing 10 and the large arrow 44 is the direction of the back air flow produced in the air intake manifold system by the engine which results in the mass air flow sensor 12 generating an erroneous signal.

A calibrated orifice 46 in the form of a slot is provided through the internal structure 36 intermediate the outlets 32 and 34 and the bypass passage 18 to reduce the mass air flow through the bypass passage due to a back air flow, thereby reducing the sensitivity of the output of the mass air flow sensor 12 to the back air flow.

Figure 5:
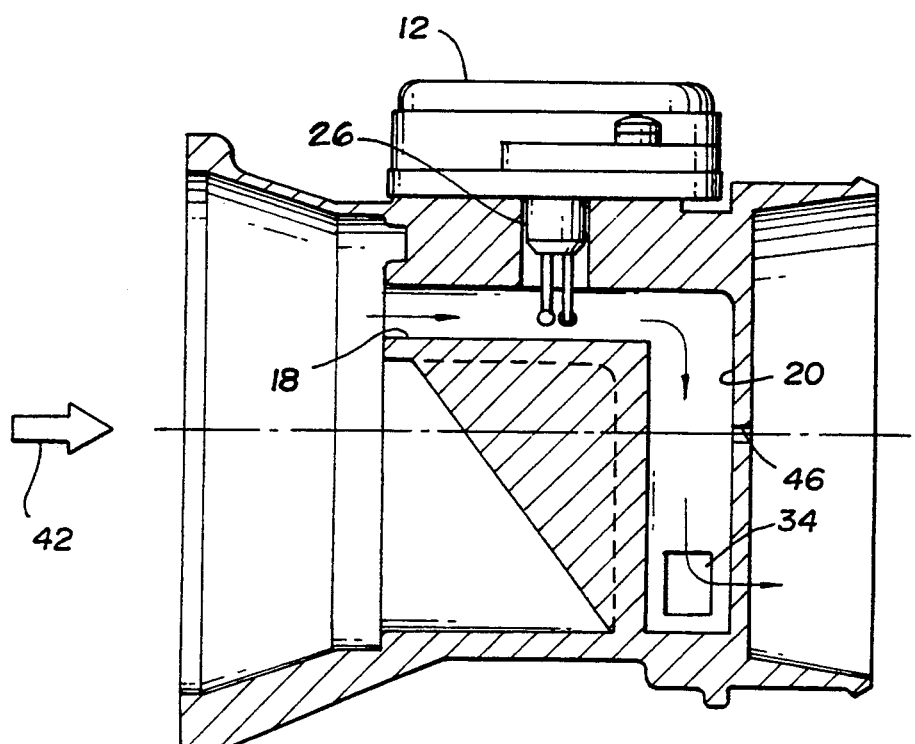
FIG. 5 is a schematic view showing a normal air flow through the auxiliary air passage.

The calibrated orifice 46 is disposed on the downstream side of the internal structure 36 and connects the recovery chamber 20 to the main air flow passage 14 downstream of the internal structure 36. Under normal operating conditions, the air flow through the bypass passage 18 and the recovery chamber 20 is as shown by arrows 40 in FIG. 5. The air flow through the calibrated orifice 46 is minimal since the air pressure downstream of the internal structure 36 is substantially the same as the air pressure upstream of the internal structure.

Figure 6:
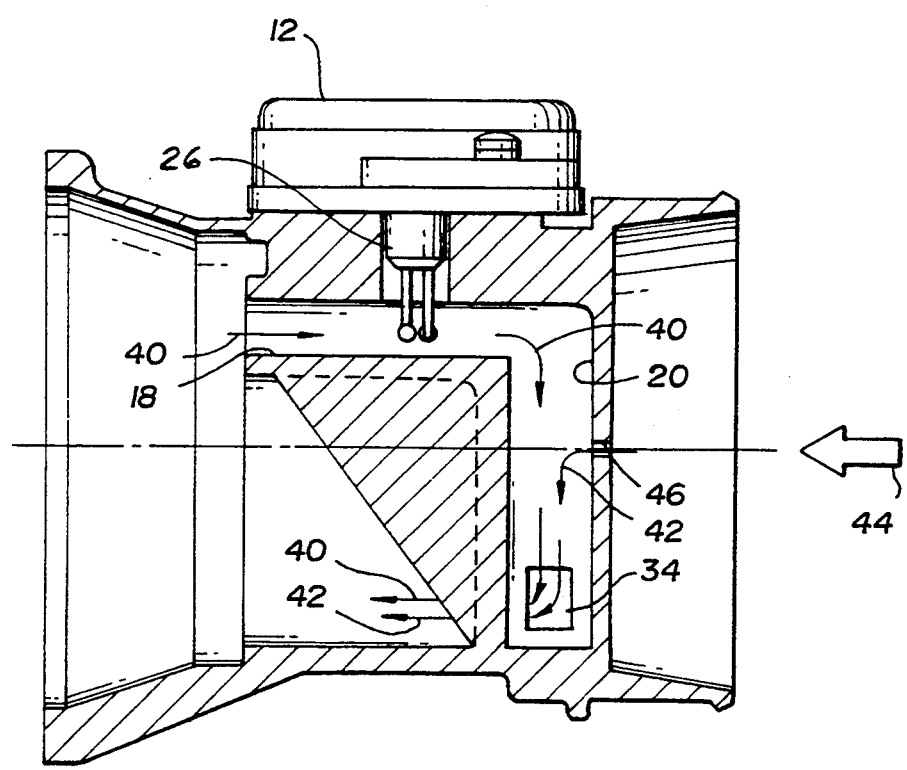
FIG. 6 is a schematic view showing the air flow pattern during a back air flow.

When a back air flow is being experienced as indicated by arrow 44, in FIG. 6, a portion of the back air flow indicated by arrows 44 enters the recovery chamber 20 through calibrated aperture 46. Because the pressure at the outlets 32 and 34 are at a lower pressure than at the calibrated aperture 46, the air passing through the calibrated aperture 46 will flow out the outlets 32 and 34. Because the size of the outlets 32 and 34 limit the air flow therethrough, the back air flow through the calibrated aperture will supplement the total air flow out through the outlets 32 and 34 and thereby reduce the air flow through the bypass passage 18. As a result, the value of the signal generated by the mass air flow sensor 12 is also reduced.

Figure 1:
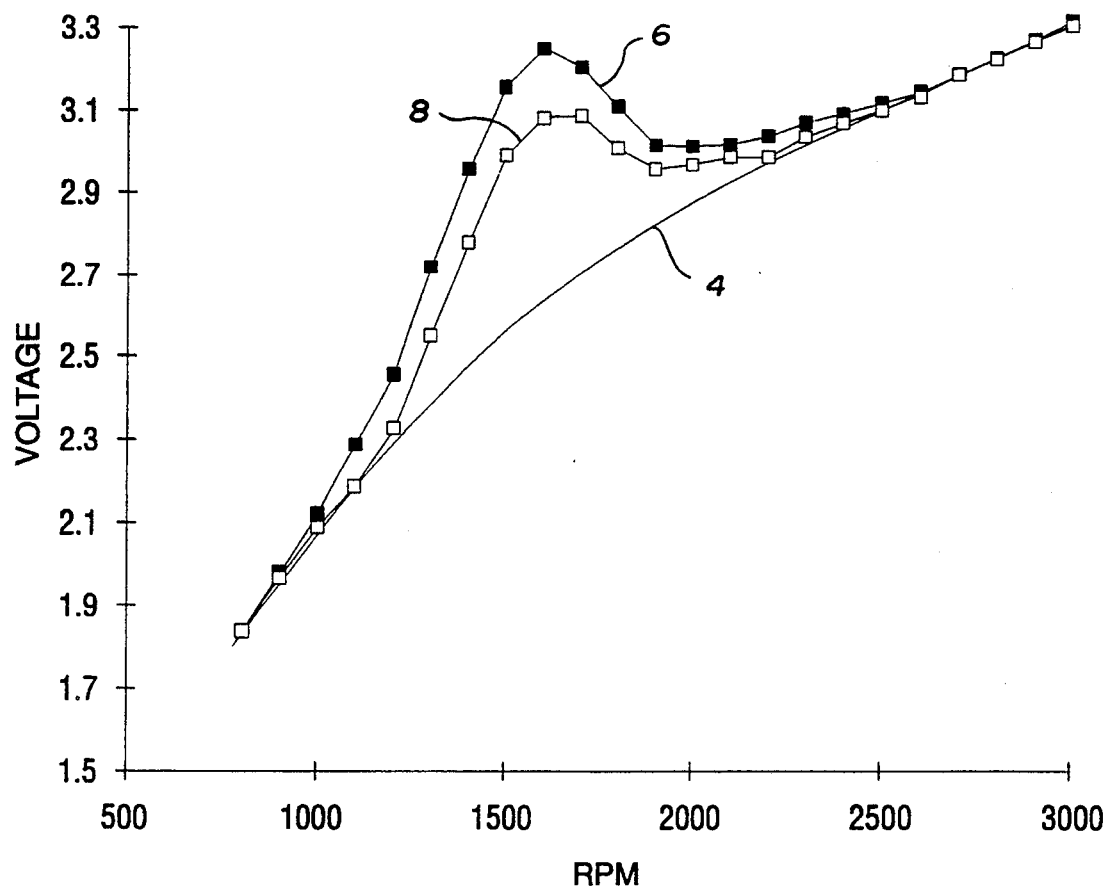
FIG. 1 is a graph showing the output of the mass air flow sensor as a function of engine speed.

In dynamic tests conducted with an experimental model of the housing structure, it was found that a calibrated orifice 46 in the form of a 10 mm wide slot, 2.4 mm high reduced the output signal generated by the mass air flow sensor in response to back air flow as indicated by curve 8 shown in FIG. 1. In the experimental model, the diameter of the recovery chamber 20 was approximately 60 mm and the slot 46 was located approximately 9 mm from the bottom of the recovery chamber. The tests also showed that the height of the calibrated orifice above the vents 32 and 34 is also a function of the diameter of the recovery chamber.

As indicated by curve 8 in FIG. 1, the calibrated orifice 46 reduced the error in the signal generated by the mass air flow sensor, in response to a back air flow from 20% to 16%. In a like manner, the engine speed range in which this error was significant was reduced by approximately 500 RPM.

It is recognized that the improvements shown by the dynamic tests and illustrated in FIG. 1 have not been optimized but are only indicative of the reduction of the sensitivity of the mass air sensor 12 to the back air flow produced by the engine between the opening of the intake valve and the completion of the exhaust stroke of the associated piston.

It is recognized that those skilled in the art may make certain changes and improvements to the housing to further reduce the sensitivity of the mass air flow sensor to the back air flow within the scope of the invention as described herein and set forth in the claims.

We claim:

1. A housing structure for reducing the sensitivity of a mass air flow sensor mounted thereon to back air flow, said housing structure comprising:

a housing having a main air flow passage passing therethrough, said housing having an input end, an output end and a longitudinal axis;

an auxiliary air passage disposed in said housing, said auxiliary air passage having a bypass passage substantially parallel to said longitudinal axis and a recovery chamber connected to said bypass passage, said bypass passage having an air inlet port and said recovery chamber having one end connected to said bypass passage and an opposite end, said opposite end having at least one outlet, said mass air flow sensor receivable in said bypass passage;

an internal structure enclosing said recovery chamber, said internal structure producing a low pressure region in the vicinity of said at least one outlet in response to an air flow through said main air flow passage, said low pressure region generating an air flow through said auxiliary air passage from said inlet port out through said at least one outlet; and an aperture having a predetermined cross-sectional area provided through said internal structure on a side facing said output end of said housing intermediate said bypass passage and said at least one outlet, said aperture connecting said recovery chamber to said main air flow passage downstream of said internal structure.

2. The housing structure of claim 1 wherein said aperture is a rectangular slot having said predetermined cross-sectional area.

3. The housing structure of claim 2 wherein said rectangular slot is located a predetermined distance from said opposite end of said recovery chamber.

4. The housing structure of claim 3 wherein said recovery chamber has a cylindrical shape, and wherein said predetermined distance is a function of the diameter of said cylindrical shape.

5. The housing structure of claim 1 wherein said bypass passage is radially offset from said longitudinal axis.

6. The housing structure of claim 5 wherein said bypass passage is disposed adjacent to an external wall of said housing and said external wall has an aperture provided therethrough, said aperture receiving therethrough a sensing head of the mass air flow sensor into said bypass passage.

7. The housing structure of claim 6 wherein said recovery chamber is disposed radially with respect to said longitudinal axis.

8. The housing structure of claim 5 wherein said at least one outlet comprises two outlets disposed on opposite sides of said internal structure.

9. The housing structure of claim 8 wherein said aperture is a rectangular slot.

10. The housing structure of claim 9 wherein said aperture is disposed a predetermined distance from said other end of said recovery chamber.

11. A sensor mount for mounting a mass air flow sensor in the air intake manifold system of an internal combustion engine, comprising:

a housing defining a main air flow passage connectable to the air intake manifold system of an internal combustion engine, said main air flow passage having a centrally disposed axis, an input end and an output end;

an air bypass passage disposed in said housing, said bypass passage having an inlet, an outlet and a sensor aperture intermediate said inlet and said outlet;

a mass air flow sensor mounted to said housing to detect the mass air flow through said bypass passage, said mass air flow sensor having a sensing head received in said bypass passage through said sensor aperture;

a recovery chamber disposed in said housing, said recovery chamber having one end connected to said outlet end of said bypass passage and at least one outlet provided adjacent to its opposite end;

an internal structure provided in said housing enclosing said recovery chamber, said internal structure producing a low pressure region in the vicinity of said at least one outlet in response to an air flow through said main air flow passage, said low pressure region inducing an air flow through said bypass passage and said recovery chamber from said inlet through said at least one outlet; and a calibrated aperture provided through said internal structure connecting said recovery chamber to said main air flow passage downstream of said internal structure, said calibrated aperture disposed intermediate said at least one outlet and said bypass passageway.

12. The sensor mount of claim 11 wherein said calibrated aperture is a slot having a predetermined cross-sectional area, said slot having a width substantially greater than its height and being located a predetermined distance from said opposite end.

13. The sensor mount of claim 12 wherein said predetermined distance is a function of a cross-sectional area of said recovery chamber.

14. The sensor mount of claim 11 wherein said bypass passage is radially offset from said central axis.

15. The sensor mount of claim 11 wherein said bypass passage is located adjacent to said external wall of said housing.

16. The sensor mount of claim 15 wherein said recovery chamber is radially disposed relative to said central axis.

17. The sensor mount of claim 16 wherein said internal structure forms venturies with said external walls of said housing and said at least one outlet comprises two diametrically disposed outlets disposed in the low pressure regions generated by said venturies in response to an air flow through said main air passage.

* * * * *